United States Patent
Drane (10) Patent No.: US 8,110,743 B2
(45) Date of Patent: Feb. 7, 2012

(54) ELECTRICAL BOX COVER WITH INSECT GUARD

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 466 days.

(21) Appl. No.: 12/365,668

(22) Filed: Feb. 4, 2009

(65) Prior Publication Data

US 2009/0211778 A1    Aug. 27, 2009

Related U.S. Application Data (60) Provisional application No. 61/066,837, filed on Feb. 22, 2008.

(51) Int. Cl.
*H02B 1/40* (2006.01)
*H05K 5/03* (2006.01)
*H02G 3/14* (2006.01)

(52) U.S. Cl. .......... 174/67; 174/66; 174/53; 174/152 G; 174/153 G; 220/3.2; 220/3.8

(58) Field of Classification Search ............. 220/242; 174/66, 67, 53, 152 G, 153 G; *H02G 3/14; H02B 1/40; H05K 5/03*
See application file for complete search history.

(56) References Cited

U.S. PATENT DOCUMENTS

| 3,997,760 | A | * | 12/1976 | Salinger ..................... 392/501 |
| 5,527,993 | A | | 6/1996 | Shotey et al. |
| 5,572,319 | A | | 11/1996 | Blackman et al. |
| 5,914,665 | A | * | 6/1999 | Thorp et al. ............... 340/691.1 |
| 5,959,250 | A | | 9/1999 | Daoud |
| 6,133,531 | A | * | 10/2000 | Hayduke et al. ............. 174/67 |
| 6,348,657 | B1 | | 2/2002 | Haslock et al. |
| 6,372,995 | B1 | * | 4/2002 | Mochizuki et al. ....... 174/152 G |
| 6,700,063 | B2 | | 3/2004 | Shotey et al. |
| 6,713,674 | B2 | * | 3/2004 | Chang ........................ 174/50 |
| 6,891,104 | B2 | * | 5/2005 | Dinh ........................... 174/67 |
| 6,921,861 | B1 | | 7/2005 | Gretz |
| 6,979,777 | B2 | | 12/2005 | Marcou et al. |
| 7,060,898 | B1 | | 6/2006 | Gretz |
| 7,259,328 | B1 | | 8/2007 | Gretz |
| 7,762,415 | B2 | * | 7/2010 | Matsui ...................... 220/4.02 |
| 2002/0125247 | A1 | | 9/2002 | Kruer |
| 2007/0215614 | A1 | * | 9/2007 | Matsui ....................... 220/3.2 |

* cited by examiner

*Primary Examiner* — Quyen Leung
*Assistant Examiner* — Terrance Kenerly
(74) *Attorney, Agent, or Firm* — Hoffmann & Baron, LLP (57) ABSTRACT

An electrical box cover including a housing and a hood pivotally attached to the housing and moveable between an open and closed position. The housing includes a base wall adapted to be attached to an electrical box. The base wall is surrounded by an outwardly extending side wall. The side wall includes a first opening defined by an edge. A guard having an opening formed therein is insertable over the first opening and securable to the side wall.

17 Claims, 6 Drawing Sheets

ELECTRICAL BOX COVER WITH INSECT GUARD

This application claims the benefit of priority of U.S. Provisional Patent Application Ser. No. 61/066,837 filed Feb. 22, 2008 which is incorporated by reference herein in its entirety.

FIELD OF INVENTION

The present invention relates to a cover for an electrical box, and more particularly, to a cover for an electrical box having a guard or barrier for restricting the intrusion of insects.

BACKGROUND OF THE INVENTION

Covers for electrical boxes are well-known in the art. Covers are attached to an electrical box and enclose a receptacle such as an electrical outlet or switch. When designed for outdoor use, such covers typically include a lid, also referred to as a hood, to selectively envelope the receptacle. Certain of these covers, known as while-in-use covers, provide the ability to leave an electrical plug inserted into an electrical receptacle while the lid is in the closed position. While-in-use electrical box covers typically include a slot or notch in a side wall of the housing or the lid in order to accommodate the plug's cord while the lid is closed.

Unfortunately, the protected space under the cover and within the box provides a welcoming environment for insects such as wasps. The insects may enter through the clearance opening around the cord and build a nest in the housing. When a user opens the lid in an attempt to access the receptacle, the user may be stung by a wasp.

Accordingly, it would be desirable to provide an electrical box cover which accommodates an electrical plug and cord and prevents the intrusion of insects when the lid is in the closed position.

SUMMARY OF THE INVENTION

The present invention provides an electrical box cover including a housing and hood pivotally secured thereto.

The present invention further provides an electrical box cover having an opening in the housing and a guard positioned over the opening.

The present invention further provides a guard which permits an electrical cord to pass there-through but restrict the ingress of insects.

The present invention still further provides an electrical box cover including a housing having a base wall adapted to be attached to an electrical box. The base wall is surrounded by an outwardly extending side wall. The side wall includes a removable tab wherein removal thereof forms a first opening defined by an edge. A hood is pivotally attached to the housing and moveable between an open and closed position. A guard having a slit formed therein is insertable into the first opening and securable to the side wall.

The present invention also provides an electrical box cover including a housing having a base wall adapted to be attached to an electrical box. The base wall is surrounded by an outwardly extending side wall. A hood is pivotally attached to the housing and moveable between an open and closed position. At least one of the housing or the hood includes a first removable tab wherein removal thereof creates a first cord entry opening defined by an edge. A guard disposed in the first cord entry opening. The guard includes resilient members having a first position substantially covering the first cord entry opening and having a second position to permit a cord to extend through the guard.

The present invention still further provides an electrical box cover including a housing including a base wall adapted to be attached to an electrical box. The base wall is surrounded by an outwardly extending side wall. A hood is pivotally attached to the housing and moveable between an open and closed position. At least one of the housing or the hood includes a first cord entry opening defined by an edge. A guard, having a slit formed therein creating an opening for receiving a cord, is insertable into the cord opening. The guard includes a resilient member having a layer of adhesive material formed on one side thereof. The guard is foldable over itself and securable to the edge.

DETAILED DESCRIPTION OF THE PREFERRED EMBODIMENTS

Figures 1, 2, 3:
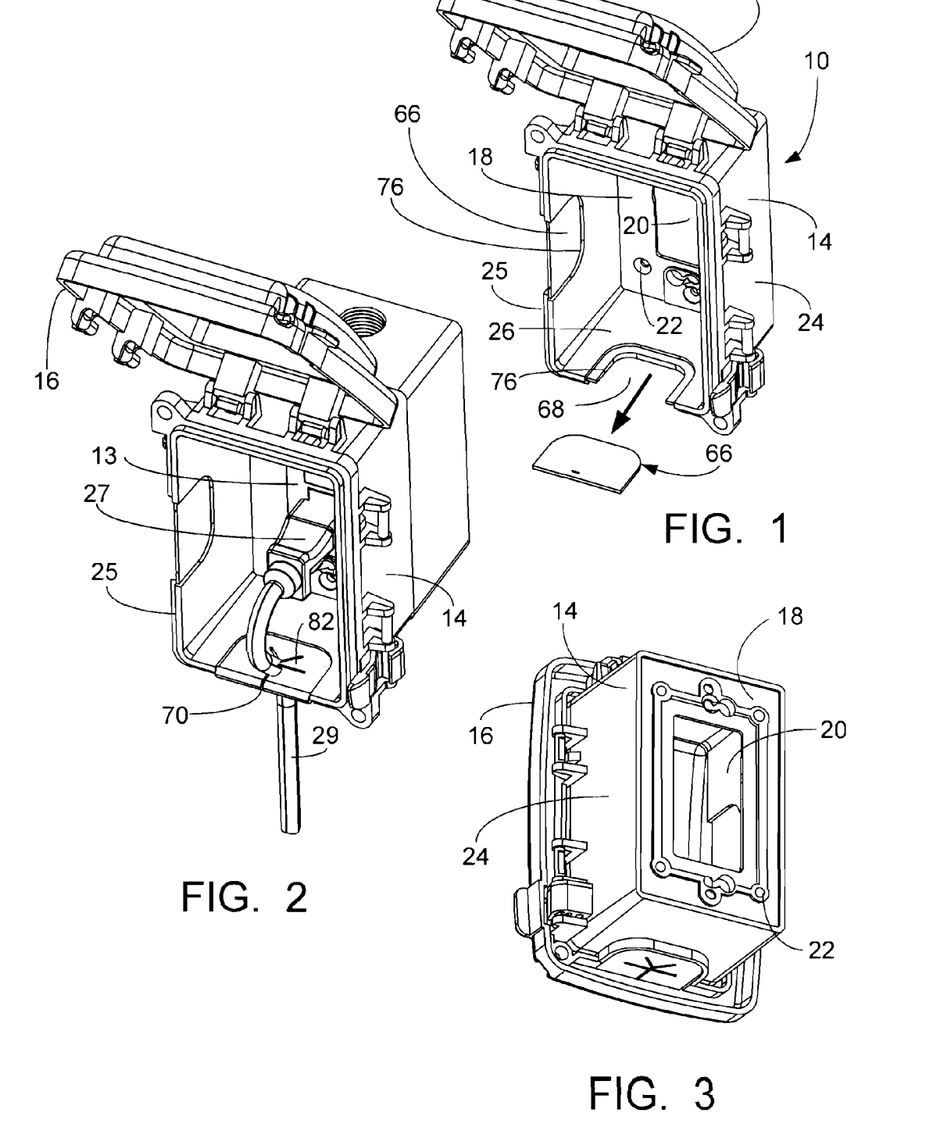
FIG. 1 is a front perspective view of an electrical box of the present invention showing a removable knockout portion.
FIG. 2 is a perspective view of the electrical box of FIG. 4 showing an electrical cord extending through the insect guard with the cover in the open position.
FIG. 3 is a rear perspective view of the electrical box cover in the closed position.

With reference to FIGS. 1 and 2, electrical box cover 10 is securable to an electrical box 12. Electrical box 12 may be an outlet box, junction box, termination box, switch box or any other type of container for housing an electrical element. The electrical box 12 may house an electrical receptacle 13 such as a switch or outlet.

Figure 7:
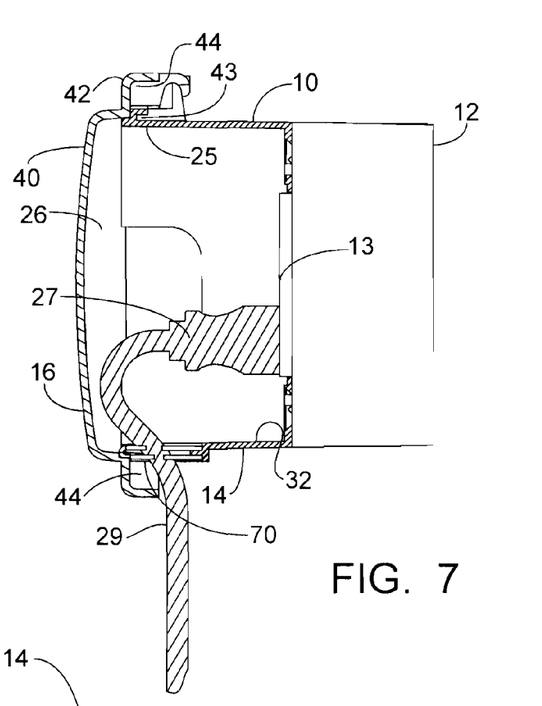
FIG. 7 is a cross-sectional view taken along lines 7-7 of FIG. 6.

Referring to FIGS. 1-3, electrical box cover 10 may include a housing 14 and a hood 16 pivotally secured thereto. The housing 14 may include a base wall 18 which includes an opening 20 there through to accommodate the electrical receptacle 13. The opening 20 may also accommodate one or more adapter plates and/or wall plates (not shown) which are configured to accommodate different receptacles, e.g., duplex outlet, GFCI, and light switch. Base wall 18 may further include through holes 22 in order to allow fastening hardware to attach the cover 10 to the electrical box 12 and/or electrical receptacle or to other components secured in the electrical box. The base wall 18 is perimetrically bounded by an outwardly extending side wall 24 having a front end 25. The base wall 18 and side wall 24 form a cover interior 26. The cover interior 26 may accommodate a plug 27 and a portion of its cord 29 when the hood 16 is in the closed position as shown in FIG. 7. The electrical cover 10 may be generally a rectangular box-like configuration having a first 28, second 30, third 32, and fourth 34 wall portions, with the first and third wall portions being shorter in length than the second and fourth wall portions. However, it is within the contemplation of the present invention that the electrical box cover 10 may be formed in a wide variety of configurations in order to accommodate various applications. Housing 14 may be formed of a plastic material or metal using processes well known in the art.

With reference to FIGS. 2 and 7, in the preferred embodiment, hood 16 may include a central portion 40 which may be flat or have a curvature thereto. Bounding the perimeter of the center portion 40 is a rim 42. Rim 42 may include an L-shaped cross-sectional profile as shown in FIG. 7. It is within the contemplation of the present invention that rim 42 may be formed in a variety of configurations. The hood at a position adjacent the rim 42 abuts a perimeter ledge 43 extending from the upper portion of the side wall 24 when the hood 16 is in the closed position. Rim 42 further includes a recess 44, and when the hood 16 is in the closed position, the recess 44 extends around the side wall front end 25. Accordingly, the cover interior 26 and the electrical receptacle 13 are isolated from precipitation, dust and other contaminants. The hood 16 may be formed of a plastic or metallic material. When formed of plastic, the hood 16 may be transparent, translucent or opaque.

Electrical boxes 12 may be installed in a variety of orientations with rectangular electrical boxes typically being installed in either generally vertical or horizontal orientations. In a preferred embodiment, cover 10 may be secured to an electrical box 12 in the two general positions. One position, shown for example in FIGS. 1, 6 and 8, would be for a generally vertically positioned electrical box. The other position, shown for example in FIGS. 9-11, would accommodate a generally horizontally oriented electrical box.

Hood 16 may be pivotally secured to the side wall 24 of the housing 14. In order to accommodate the various mounting orientations, hood 16 is preferably pivotally mountable to cover housing 14 along either one of two side wall portions.

Figure 5:
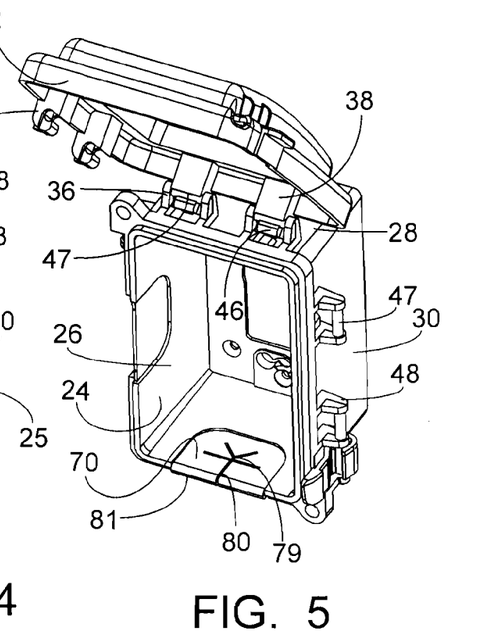
FIG. 5 is a front perspective view of the electrical box of FIG. 1 showing the insect guard installed.

With further reference to FIG. 5, one of the side wall portions, for example the first side wall portion 28, may include one or more housing first hinge members 36 thereon. The hinge members 36 may be spaced from each other and disposed adjacent the side wall front end 25. These housing first hinge members 36 cooperate with hood first hinge members 38 disposed on, and extending from, the hood rim 42. The hood first hinge members 38 may include C-shaped clips 46. Housing first hinge members 36 may include round posts 47 supported above the side wall 24. Clips 46 may resiliently engage and snap around posts 47 such that a rotatable connection is made. The housing first hinge members 36 and hood first hinge members 38 may be disposed along one side of their respective structures such that the hood 16 may be attached to the top of the housing 14 when the cover 10 is mounted in the vertical orientation as shown in FIG. 5. The clips 46 may also be removable from the posts 47 so that the hood 16 could be selectively attached and removed from the housing 14. Posts 47 may include flats thereon in order to facilitate the attachment and removal of the hood. It is also within the contemplation of the present invention that as an alternative C-shaped clips could be mounted on the housing 14 and the posts being mounted on the hood 16.

Figures 10, 11, 12:
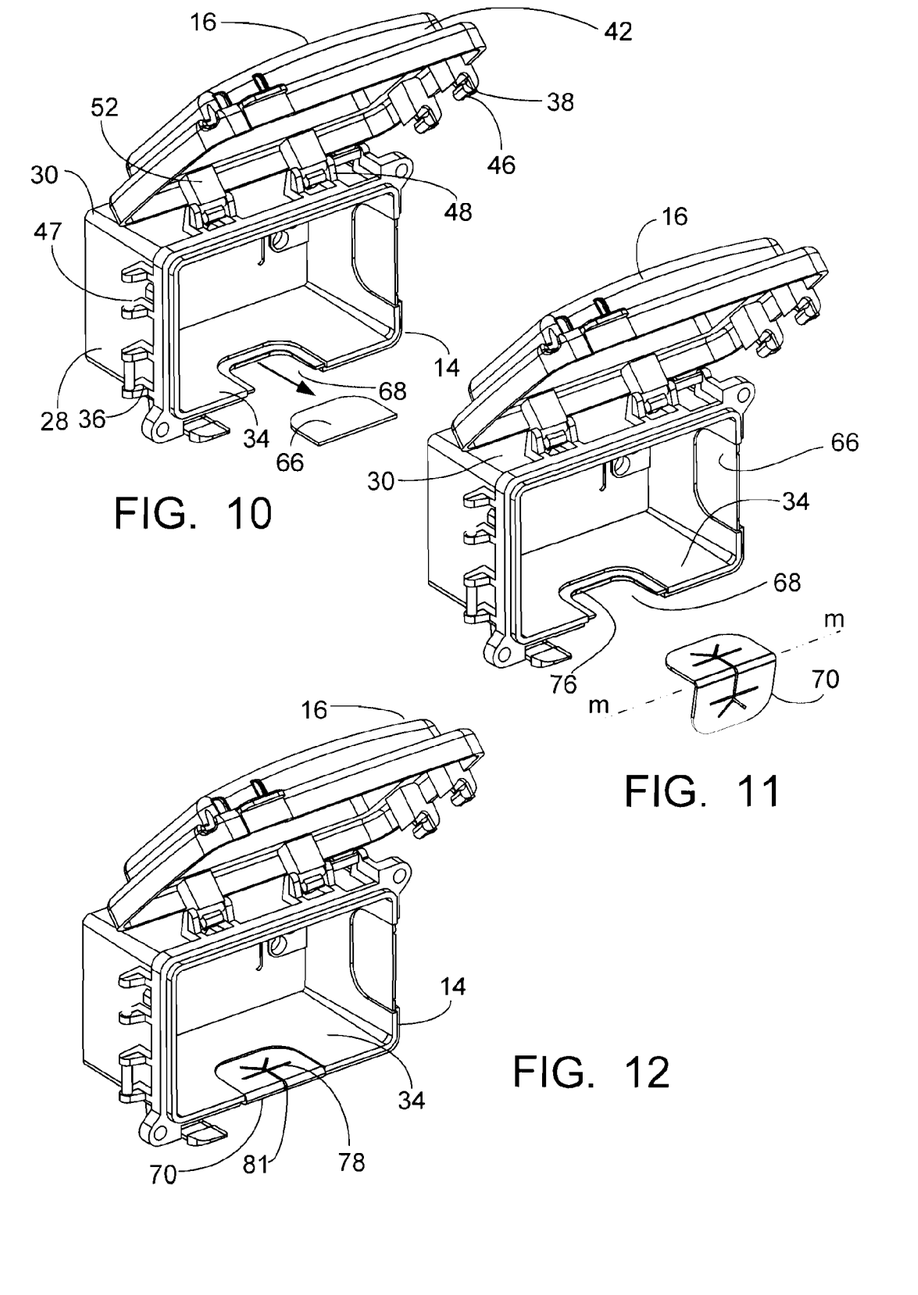
FIGS. 10-12 include front perspective views of the electrical box cover of FIG. 1 showing the cover in a generally horizontal position.
Figure 13:
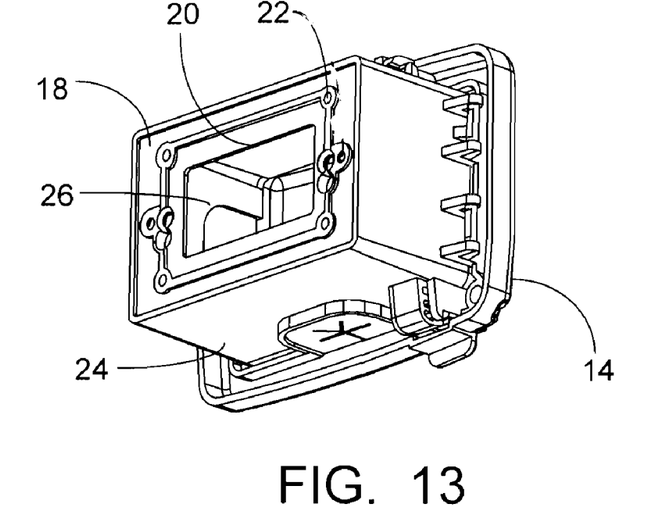
FIG. 13 is a rear perspective view of the electrical box cover in the horizontal orientation with the hood in the closed position.

The housing 14 may further include one or more housing second hinge members 48 disposed on a side wall portion adjacent the first portion 28, such as second side wall portion 30. Housing second hinge members 48 may be formed including a round post 47 supported above the side wall 24 similar to housing first hinge members 36. Hood 16 may further include hood second hinge members 52 extending from an adjacent side of the hood edge as the hood first hinge members 38. Hood second hinge members 52 may be formed similar to the hood first hinge members 38. Hood second hinge members 52 may resiliently engage posts 47 of housing second hinge members 48 to form a rotatable connection. This connection accommodates the cover 10 when mounted in the horizontal orientation as shown in FIG. 10. The resilient cooperation between the hood second hinge members 52 and the housing second hinge members 48 permits the hood to be attached and removed.

When it is desired to mount the electrical box cover 10 in a generally vertical position, hood 16 may be attached to the first side wall portion 28 through the cooperation of housing first hinge members 36 and hood first hinge members 38 as shown for example in FIG. 5. Alternatively, if the electrical box is desired to be mounted in a generally horizontal orientation such as that shown in FIG. 10, the hood 16 may be attached to the second wall portion 30 through the cooperation of housing second hinge members 48 and hood second hinge members 52. The mounting flexibility of the hood 16 permits the hinge to be located at the top of the cover housing 12 regardless of the orientation. Therefore, the hood will tend to fall to the closed position via gravity when left unattended.

Referring to FIGS. 1, 2 and 7, once the electrical box cover 10 is installed to the electrical box 12, the plug 27 may be inserted into the receptacle 13. The plug cord 29 would therefore extend out from the cover 10. In order to permit the hood 16 to be rotated to the fully closed position when the cord 29 is extending from the cover, an opening is preferably provided in the housing side wall 24. It is desirable to have the cord to extend out from the bottom of the cover. Since the cover has two different orientations, either third wall portion 32 or fourth wall potion 34 will be the cover bottom wall. Accordingly, in the preferred embodiment, both the third 32 and fourth 34 side wall portions include a tab-like knockout 66 formed therein. However, only one of them needs to be removed. The knockouts 66 may be formed in a manner known in the art such as by thinning the knockout or thinning material surrounding the knockout such that it is easy to remove. The knockout 66 in the third side wall 32 portion may be removed forming an opening 68 when the electrical box is in the generally vertical direction as shown in FIG. 1. The knockout 66 on the fourth side wall 34 portion may be removed forming an opening 68 when the electrical box is in the generally horizontal position as shown in FIG. 10.

When electrical box cover 10 is installed in an exterior application, the cover interior 26 is susceptible to the entrance of insects which may form nests in the protected environment of the interior. Even with the hood in the closed position, the opening created to permit the cord to extend from the cover provides a potential opening for insects. Such insects may contaminate the interior, fouling the electrical receptacle. In addition, if the nests are built by wasps or other stinging insects, this can make access to the electrical receptacle dangerous for a user. In order to prevent insects from entering the closed cover through the opening 68 through a cord may pass, a guard 70 is provided to prevent entrance of insects after one of the knockouts 66 has been removed. The guard 70 is formed to permit the cord of an electrical plug to pass therethrough.

With reference to FIGS. 1, 4, 5 and 9, guard 70 is preferably a resilient structure formed of an elastomeric material such as rubber or foam rubber. The guard 70 may be a generally planar member having an adhesive back surface 72 which is covered by removable release paper 74. In order to install the guard in side wall portion 32, the knockout 66 is removed resulting in opening 68. The release paper may be removed from guard 70 exposing the adhesive. The guard 70 may then be folded along its medial line M-M and secured to the edge 76 surrounding the opening 68 left by the removed knockout 66. The edges of the guard's adhesive back surface 72 adhere to the top and bottom surface of the side wall edge 76. The portion of the guard's adhesive back surface 72 which does not engage the side wall adheres to itself when the guard is installed. Accordingly, the guard 70 is securely held to the housing side wall and seals the opening 68.

Figure 4:
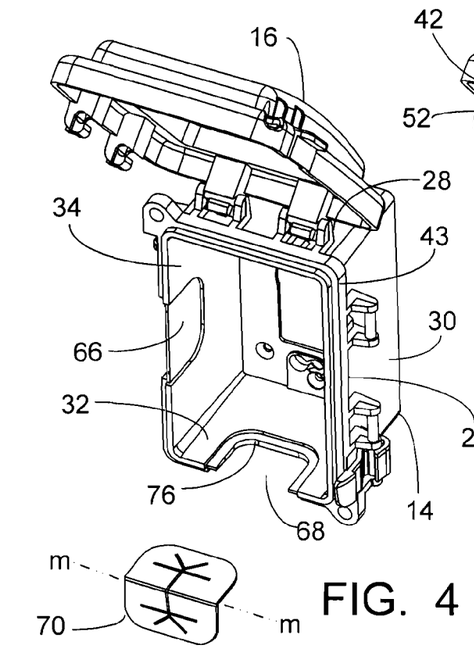
FIG. 4 is a front perspective view of the electrical box of FIG. 1 showing the insect guard prior to installation.

The manner of installing the guard is the same regardless on which side wall portion it is installed. FIGS. 1, 4 and 5 show the guard 70 installed on side wall portion 32 when the cover is oriented in a vertical orientation. FIGS. 10-13 show the guard 70 as being installed in side wall portion 34 which is preferably used when the cover 10 is in the horizontal position.

Figure 6:
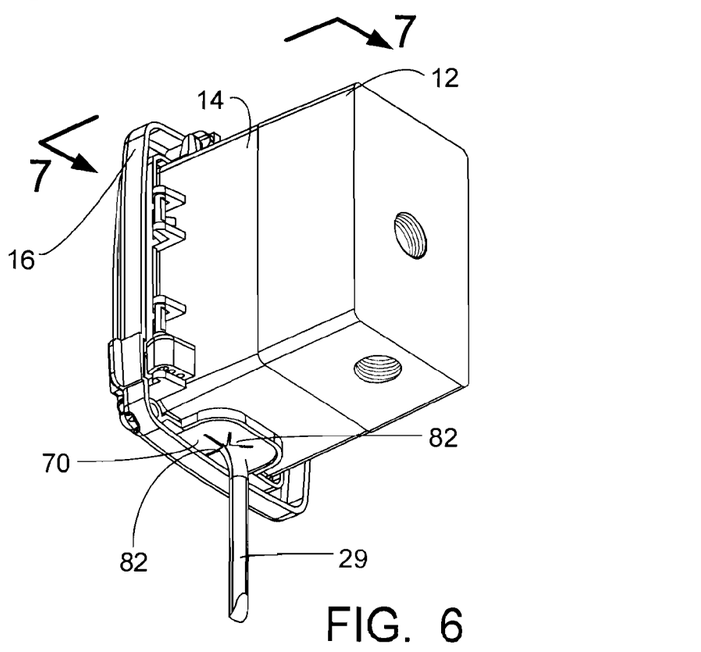
FIG. 6 is a bottom perspective of the electrical box cover showing the hood in the closed position and an electrical cord extending through the insect guard.

Guard may include one or more slits 78 extending there through. When the guard is folded along its medial line M-M, the slits 78 radially extend from a center point 79 (FIG. 5). One of the slits 80 extends to the edge 81 of the folded guard. Therefore, the cord 29 may be slid into the guard 70 and a large plug 27 need not pass through the guard 70. As shown in FIGS. 2 and 6, the slits create resilient fingers 82 which permit the plug 27 and cord 29 to extend there through. The resilient nature of the guard fingers 82 causes them to compress against and engage the cord 29, thereby reducing gaps between the cord 29 and the guard 70. Accordingly, a corded plug may be maintained within the electrical receptacle with the hood 16 in the closed position and without any significant opening which would permit the ingress of insects and other contaminants into the cover 10. When a cord is not extending through the guard, the fingers may assume a relaxed position forming a closed surface which covers opening 68 such that contamination and/or insects cannot enter the cover interior 26.

Guard 70 may be used to cover the opening 68 formed in either side wall portion. The knockout 66 may remain in the side wall portion which is not being used to allow the cord to pass through. Accordingly, the integrity of the cover interior is maintained since unused openings are not formed in the cover.

Figure 8:
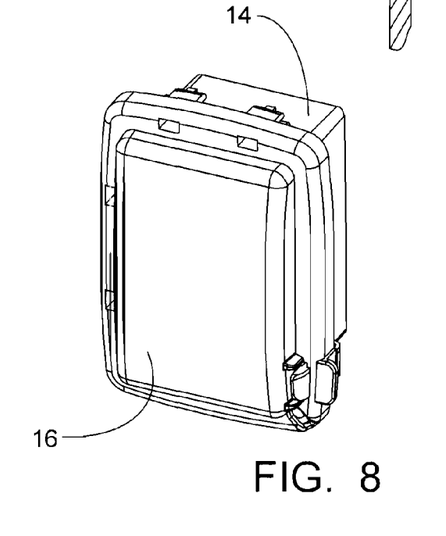
FIG. 8 is a front perspective view of the electrical box cover in the vertical orientation with the hood in the closed position.
Figure 9:
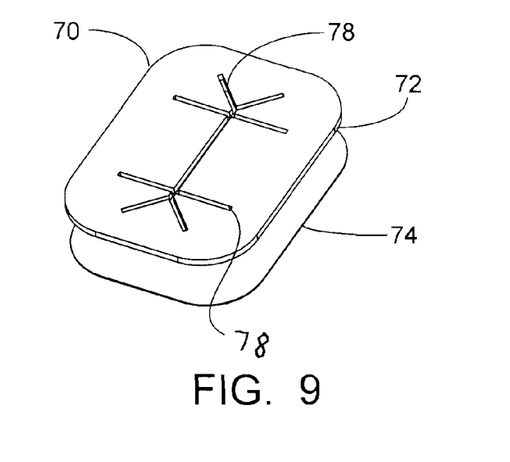
FIG. 9 is a perspective view of an insect guard of the present invention.

In an alternative embodiment shown in FIG. 8, the guard 90 may be made of a resilient material such as rubber or foam rubber. Guard 90 may have a configuration generally conforming to the shape of opening 68. At least a portion of a guard outer perimeter 92 may include spaced walls 93 forming a channel 94 extending along the perimeter. The channel 94 may be configured to receive the edges 76 of the opening 68. Guard 90 may be slid on to the side wall 24, thereby covering the knockout opening 68. When installed, the walls 93 sandwich there between the opening edge 76, thereby retaining the guard 90 in place. The engagement between the channel 94 and edge 76 may result in a pressure or friction fit between the two thereby helping retain the guard in place. A guard central portion 96 may include one or more slits 98. In one embodiment, the slits radiate from a generally central point 99. One of the slits 100 extends to a guard front edge to permit the cord of a plug to pass through the guard. Slits permit the cord 29 to be inserted there through and the fingerlike projections 101 will deform to closely surround and engage the cord 29 and reduce gaps between the cord and the guard thereby restricting the ingress of insects or other contamination.

Figure 14:
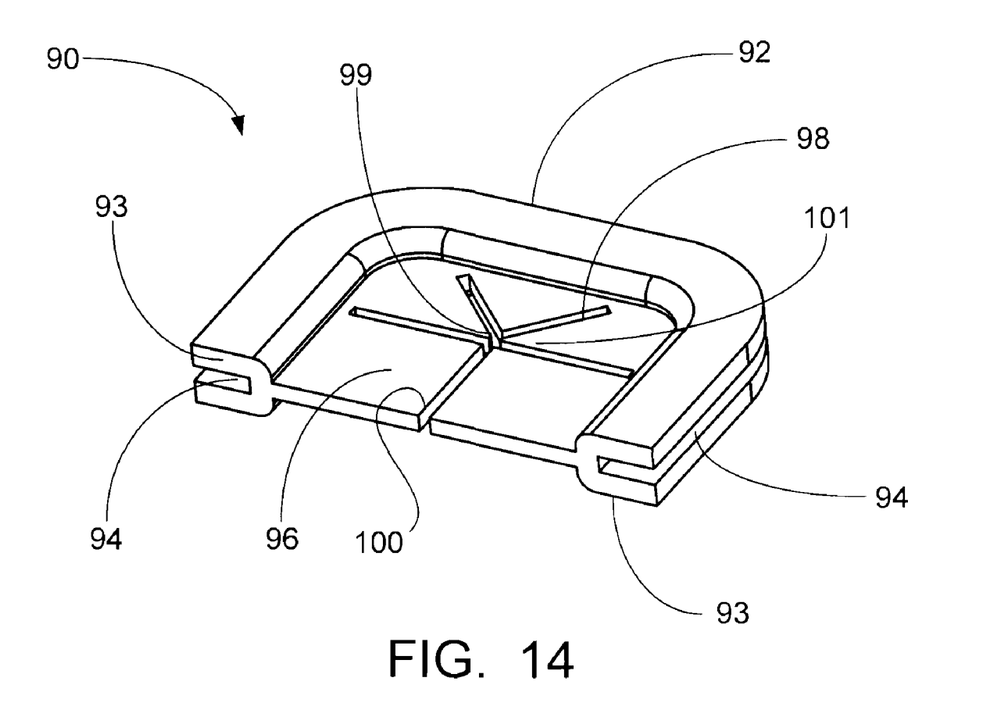
FIG. 14 is a perspective view of an alternative embodiment of an insect guard of the present invention.
Figure 15:
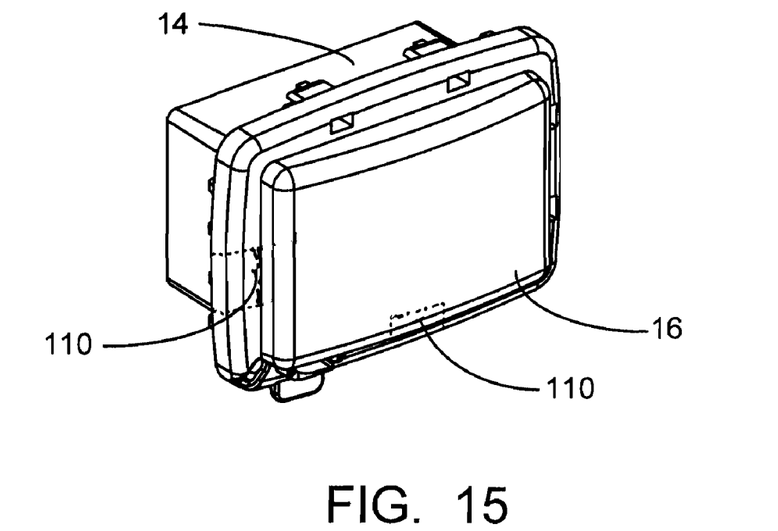
FIG. 15 is a front perspective view of the electrical box cover in the horizontal orientation with the hood in the closed position.
Figure 16:
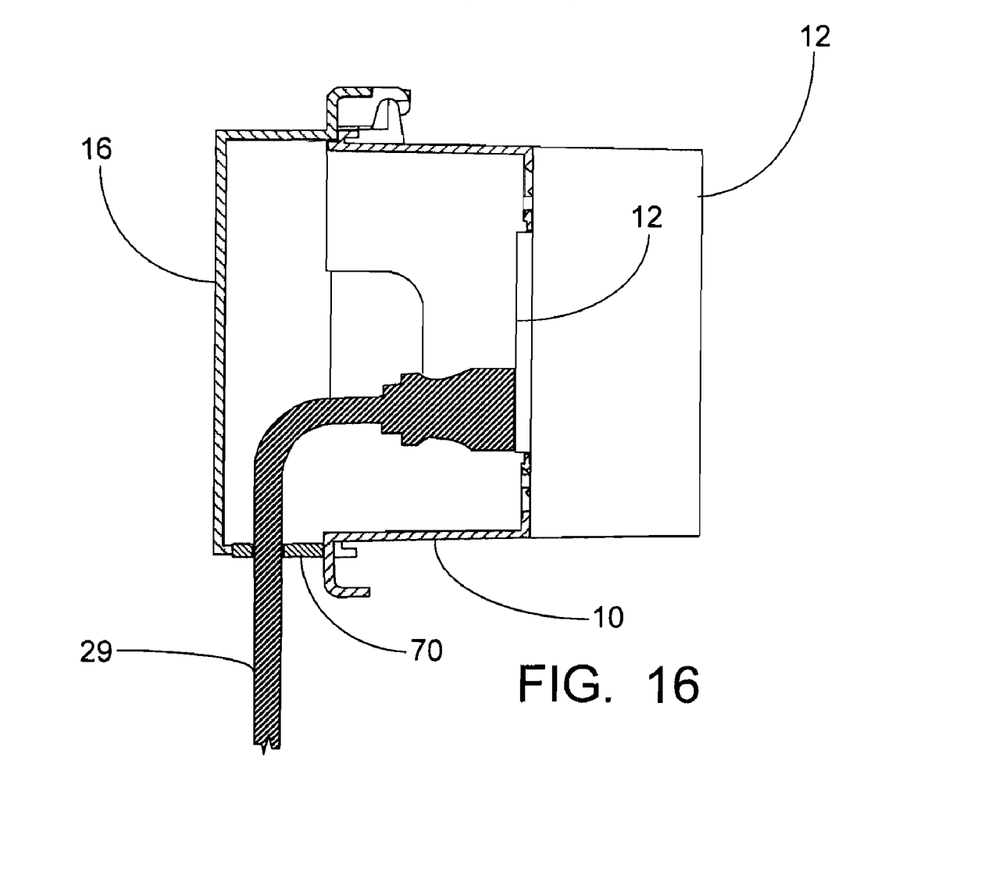
FIG. 16 is a cross-sectional view of an alternative embodiment of the cover of the present invention.

While the embodiments described above disclose the guard 70 being mounted to the housing 14, it is equally adoptable to being mounted to hood 16 as shown in FIGS. 15 and 16. Hood 16 may therefore include a knockout 110 the removal thereof results in an opening for receiving the guard 70. The cord 29 may then pass through the guard 70. The hood 16 may include a plurality of knockouts 110 (shown in phantom in FIG. 14) located at different locations to accommodate the different positioning of the cover. Of course, in this embodiment, the perimeter of hood 16 may be formed having a depth sufficient to accommodate a cord ingress/egress opening that is sealed by the guard 70 in the manner described.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:
1. An electrical box cover comprising:
    a housing including a base wall adapted to be attached to an electrical box, said base wall being surrounded by an outwardly extending side wall, said side wall having an inner and outer surface, said side wall including a removable tab wherein removal thereof forms a first opening defined by an edge;
    a hood pivotally attached to said housing and moveable between an open and closed position; and
    a guard having a slit formed therein, said guard being insertable into said first opening, said guard being foldable over itself wherein a first portion of the guard adheres to itself and a second portion securedly adheres to said inner and outer surface of said side wall extending about said first opening.
2. The cover as defined in claim 1, wherein said guard includes a resilient member having a layer of adhesive material formed on one side thereof.
3. The cover as defined in claim 1, wherein said side wall includes a second removable tab, wherein removal thereof forms a second opening.
4. The cover as defined in claim 3, wherein said side wall includes a first and second portion, and said first opening is on said first side wall portion and said second opening is on said second side wall portion.
5. The cover as defined in claim 4, wherein said first side wall portion forms a bottom of the cover when said cover is mounted in a substantially vertical orientation and said second side wall portion forms said bottom of said cover when said cover is mounted in a substantially horizontal orientation.
6. The cover as defined in claim 1, wherein said guard opening is deformable to resiliently engage an electric cord.
7. The cover as defined in claim 1, wherein the slits define a plurality of resilient members which have a first position forming a closed surface.

8. The cover as defined in claim 1, wherein resilient members deformable to a second position to permit an electrical cord to extend there through, the resilient members being engagable with the cord to close gaps between the cord and the guard.

9. The cover as defined in claim 1, wherein the guard includes an uninterrupted perimeter and a plurality of slits formed within an interior of the guard, and wherein when the guard is in an unfolded state, none of the slits extend to the perimeter.

10. The cover as defined in claim 9, wherein the guard when in a folded state includes a slit extending to the edge thereof to permit entry of a cord.

11. An electrical box cover comprising:
a housing including a base wall adapted to be attached to an electrical box, said base wall being surrounded by an outwardly extending side wall;
a hood pivotally attached to said housing and moveable between an open and closed position, at least one of said housing or said hood including a first removable tab wherein removal thereof creates a first cord entry opening defined by an edge; and
a guard secured about said first cord entry opening, said guard having a plurality of resilient members having a first position substantially covering the first cord entry opening and having a second position to permit a cord to extend through the guard, and a portion of the housing or hood directly opposed from the first cord entry when the hood is in the closed position is uninterrupted and substantially ridged and engages the guard.

12. The cover as defined in claim 11, wherein in at least one of said housing or hood includes a second removable tab, wherein removal thereof creates a second cord entry opening.

13. The cover as defined in claim 12, wherein the first removable tab and said second removable tab are formed on different sides of said cover.

14. The cover as defined in claim 11, wherein the resilient members are formed by a plurality of slits extending through the guard.

15. The cover as defined in claim 14, wherein at least one of said plurality of slits extends to an edge of said guard.

16. An electrical box cover comprising:
a housing including a base wall adapted to be attached to an electrical box, the base wall being surrounded by an outwardly extending side wall;
a hood pivotally attached to said housing and moveable between an open and closed position, at least one of said housing or said hood including a first cord entry opening defined by an edge; and
a guard having a slit formed therein creating an aperture for receiving a cord, said guard being insertable into said first cord entry opening, said guard including a resilient member having a layer of adhesive material formed on one side thereof, said guard being foldable over itself and securable by said adhesive material to said edge, said guard in said folded state having a slot leading from a front edge of the folded guard to an interior portion of the guard having a plurality of slits extending outwardly therefrom, wherein the slot permits an electrical cord to be inserted therein and into the guard interior portion and said plurality of slits are deformable to permit an electrical cord to extend through the guard and be retained thereby, said resilient members being engagable with the cord to close gaps between the cord and the guard.

17. The cover as defined in claim 16, wherein in at least one of said housing or hood includes a removable tab, wherein removal thereof creates the first cord entry opening.

\* \* \* \* \*